US008214810B2

(12) United States Patent
Dettinger et al.

(10) Patent No.: US 8,214,810 B2
(45) Date of Patent: Jul. 3, 2012

(54) METHOD OF COMPILING SOURCE CODE, COMPILER, COMPUTER SYSTEM, AND COMPUTER PROGRAM PRODUCT

(75) Inventors: Mark Dettinger, Rheinfelden (CH); Andreas Krebbel, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1344 days.

(21) Appl. No.: 11/846,071

(22) Filed: Aug. 28, 2007

(65) Prior Publication Data
US 2008/0059957 A1  Mar. 6, 2008

(30) Foreign Application Priority Data
Aug. 29, 2006  (EP) ..................................... 06119711

(51) Int. Cl.
*G06F 9/44* (2006.01)
*G06F 9/45* (2006.01)

(52) U.S. Cl. ......... 717/143; 717/120; 717/140; 717/170
(58) Field of Classification Search ........................ None
See application file for complete search history.

(56) References Cited

U.S. PATENT DOCUMENTS

| 6,110,227 | A  | * | 8/2000  | Marcelais et al. ............ 717/170 |
| 6,185,733 | B1 |   | 2/2001  | Breslau et al. .................... 717/5 |
| 6,279,151 | B1 |   | 8/2001  | Breslau et al. .................... 717/6 |
| 7,111,283 | B2 | * | 9/2006  | Fraser et al. ................... 717/143 |
| 7,861,236 | B2 | * | 12/2010 | Grebenev ...................... 717/120 |
| 7,971,194 | B1 | * | 6/2011  | Gilboa ........................... 717/140 |
| 2003/0154470 | A1 | * | 8/2003 | Applin et al. ................. 717/170 |
| 2006/0155740 | A1 | * | 7/2006 | Chen et al. .................... 707/102 |
| 2006/0174235 | A1 | * | 8/2006 | Kamada et al. ............... 717/141 |
| 2008/0059957 | A1 | * | 3/2008 | Dettinger et al. ............. 717/140 |
| 2008/0086457 | A1 | * | 4/2008 | Fei et al. ........................... 707/3 |
| 2009/0178031 | A1 | * | 7/2009 | Zhao ............................. 717/143 |
| 2009/0313604 | A1 | * | 12/2009 | Miceli ........................... 717/120 |
| 2010/0146494 | A1 | * | 6/2010 | Gellerich et al. ............. 717/143 |
| 2010/0306848 | A1 | * | 12/2010 | Gellerich ........................ 726/24 |
| 2011/0161840 | A1 | * | 6/2011 | Wong et al. .................... 715/760 |

OTHER PUBLICATIONS

IBM, "Compiler Reference—IBM XL C/C++ Advanced Edition for Linux, V9.0", 2007 IBM, pp. 1-356 <http://bluegene.epfl.ch/vac_pdf/compiler.pdf>.*
Conradi et al., "Version Models for Software Configuration Management", 1998 ACM, vol. 30, No. 2, Jun. 1998, pp. 232-282 <http://dl.acm.org/results.cfm?h=1&source_query=&&cfid=85545986&cftoken=40062146>.*
Aversano el al., "Handling Preprocessor-Conditioned Declarations", SCAM'02, 2002 IEEE, pp. 1-10 <http://ieeexplore.ieee.org/stamp/stamp.jsp?tp=&arnumber=1134108 >.*
2.1 Include Syntax, Include Syntax—The C Preprocessor, [Retrieved on Aug. 8, 2007], p. 1.
PHP: PHP Manual—Manual [online], Retrieved from the Internet:<URL: http://de.php.net/manual/en/index.php>, The PHP Group, Retrieved on Aug. 8, 2007, pp. 1-7. include( ), PHP: include—Manual [online], The PHP Group, Last updated: Sat, Aug. 9, 2003, [Retrieved on Aug. 8, 2007], pp. 1-17.

\* cited by examiner

*Primary Examiner* — Thuy Dao
*Assistant Examiner* — Ben Wang
(74) *Attorney, Agent, or Firm* — William A. Kinnaman, Jr.

(57) ABSTRACT

A method of compiling source code, involving a pre-processing step for including at least one additional source code file into the source code prior to generating target code from the source code. The proposed method further comprises the steps of: establishing, during the pre-processing step, at least one network connection to at least one remote server; and downloading the additional source code file from the remote server.

10 Claims, 6 Drawing Sheets

METHOD OF COMPILING SOURCE CODE, COMPILER, COMPUTER SYSTEM, AND COMPUTER PROGRAM PRODUCT

CROSS-REFERENCE TO RELATED APPLICATION

This application claims the priority benefit under 35 U.S.C. §119 of prior European application 06119711.7, filed Aug. 29, 2006, and incorporated herein by reference.

BACKGROUND OF THE INVENTION

1. Field of the Invention

The present invention relates to a method of compiling source code, involving a pre-processing step for including at least one additional source code file into the source code prior to generating target code from the source code.

The present invention also relates to a compiler for compiling source code, the compiler comprising a pre-processor adapted to include at least one additional source code file into the source code prior to generating target code from the source code.

The present invention further relates to a computer system for compiling source code and to a computer program product for use on a computer.

2. Description of the Related Art

Compiling of computer programs, i.e., translating source file text or source code to a predetermined type of target code, typically involves a pre-processing step to include additional text in the form of additional source code files into a main source file text by means of a pre-processor. A well-known example from the C programming language is the pre-processor command #include "include.h" which commands the pre-processor to include additional source file text comprised in the additional source code file "include.h" into the main source file text, which is typically denoted "main.c" in the present example. The additional source code files are also commonly referred to a header files (*.h).

In a general way, the pre-processor allows text manipulations before actual compilation of a source code file. In the present example, the include directive is replaced with a text file, which is usually stored on a local hard disk of the machine compiling the source code.

As known to a person skilled in the art, real world software projects may include up to 100 different files or more. Most of these files are header files from libraries, i.e., collections of sub-programs for software development, wherein the header files define an Application Programming Interface (API) to that particular library by means of function prototypes. For instance, the Xine executable of the heavily used Xine media player on Linux™ is linked against 34 libraries. Xine comprises the xine-ui user interface and a shared library xine-lib packages which currently include a combined number of 390 external header files.

However, APIs generally are not fixed, since the libraries are constantly being developed, i.e. updated to keep up with changing requirements and specifications. This leads to the particular problem that local copies of the above-mentioned header files quickly become outdated. Thus, frequent time-consuming and cumbersome manual updates of header files are required.

SUMMARY OF THE INVENTION

It is an object of the present invention to provide a method of compiling source code of the above-defined type which is less tedious and more time-effective from a developer's point of view.

It is also an object of the present invention to provide a compiler of the above-defined type, a computer system, and a computer program product, which can be used for translating the method into practice.

According to a first aspect of the present invention these objects are achieved by providing a method of the above-defined type which comprises the steps of: establishing, during the pre-processing step, at least one network connection to at least one remote server; and downloading the additional source code file from the remote server.

According to a second aspect of the present invention these objects are achieved by providing a compiler of the above-defined type, the compiler comprising: means for establishing at least one network connection to at least one remote server; and means for downloading the additional source code file from the remote server.

According to a third aspect of the present invention these objects are also achieved by providing a computer system of the above-defined type, the computer system comprising: at least a first computer comprising first storing means and a source code stored in the first storing means; and at least a second computer comprising second storing means and at least one additional source code file stored in the second storing means, wherein the first and second computers are connectable by means of a network connection, the computer system further comprising on the first computer a compiler according to the second aspect of the present invention, wherein the means for establishing a network connection are adapted to establish the network connection between the first and second computers for downloading the additional source code file from the second computer.

According to a fourth aspect of the present invention these objects are further achieved by providing a computer program product for use on a computer, comprising code sequences for implementing and/or configuring on the computer a compiler according to the second aspect of the present invention.

Thus, according to a general idea underlying the present invention additional source code files to be included in a source code prior to compilation are downloaded or fetched from a remote entity via a suitable network connection during the pre-processing step. This obviates the necessity for frequent and time-consuming manual updates of local copies of the additional source code files.

In order to reduce network traffic, in a further embodiment of the method in accordance with the present invention the latter further comprises the step of locally caching the at least one additional source code file. In a corresponding embodiment of the compiler in accordance with the present invention, the latter comprises means for locally caching the additional source code file.

For improved functionality, a further embodiment of the method in accordance with the present invention may include using a local copy of the additional source code file if the network connection cannot be established.

In order to further reduce network traffic, yet another embodiment of the method in accordance with the present invention comprises the steps of: checking a current version of the additional source code file on the remote server; and using a local copy of the additional source code file if the current version of the additional source code file has been previously downloaded.

In a corresponding embodiment of the compiler in accordance with the present invention the latter comprises means for checking a current version of the additional source code file on the remote server.

In yet another embodiment of the compiler in accordance with the present invention the version-checking means are in operative connection with the downloading and caching means to command using a locally cached copy of the additional source code file if the current version of the additional source code file has been previously downloaded from the remote server.

In another embodiment of the method in accordance with the present invention the latter comprises the step of providing a network location of the additional source code file as an element of the source code, i.e., within the source code itself, e.g., in the form of an include directive, as described above. However, for increased operational flexibility a further embodiment of the method in accordance with the present invention may comprise the step of providing and/or modifying a network location of the additional source code file in the form of a command option when invoking a compiler for compiling the source code. In this way, no editing of source code is required to modify the network location.

In order to reduce compiling time, in a further embodiment of the method in accordance with the present invention, source code compilation can be accelerated by including in the method the step of downloading a precompiled version of the additional source code from the at least one remote server.

Furthermore, in accordance with yet another embodiment of the method in accordance with the present invention the latter may comprise the step of establishing a plurality of network connections with different remote servers and/or using different connection protocols. In case of parallel connections this may further seed up the compilation process.

In a corresponding embodiment of the compiler in accordance with the present invention the means for establishing the network connection are adapted to establish a plurality of network connections with different remote servers and/or using different connection protocols.

In a further embodiment of the computer program product in accordance with the present invention the latter comprises further code sequences for operating the compiler in accordance with the method according to the first aspect of the present invention.

Further advantages and characteristics of the present invention can be gathered from the following description of preferred embodiments given by way of example only with reference to the enclosed drawings. Features mentioned above as well as below can be used in accordance with the present invention either individually or in conjunction. The described embodiments are not to be regarded as an exhaustive enumeration but rather as examples with respect to a general concept underlying the present invention.

DETAILED DESCRIPTION

Figure 1:
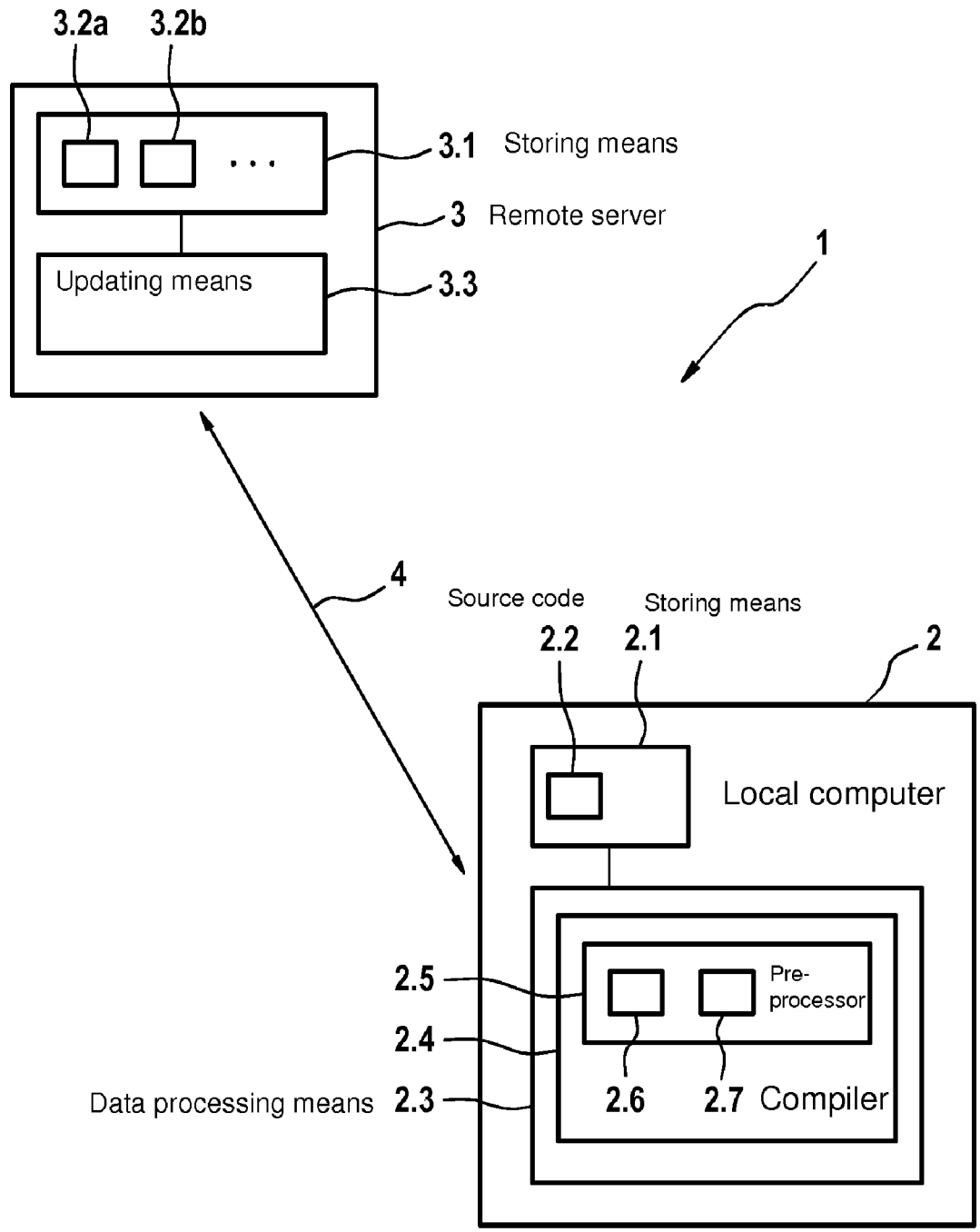
FIG. 1 is a schematic block diagram of a first embodiment of the computer system in accordance with the present invention comprising an embodiment of the compiler in accordance with the present invention.

FIG. 1 shows a schematic block diagram of a first embodiment of a computer system 1 in accordance with the present invention comprising an embodiment of the compiler in accordance with the present invention. Generally, computer system 1 comprises at least a first computer 2 and at least a second computer 3. Hereinafter, first computer 2 will also be referred to as local computer, whereas second computer 3 will also be referred to as remote server. Local computer 2 and remote server 3 are connectable by means of a network connection 4 (illustrated by means of a double-headed arrow in FIG. 1), which may involve a wired or a wireless connection via further computers or networking entities (not shown), as known to a person skilled in the art.

Local computer 2 comprises storing means 2.1 for storing source code 2.2, e.g., in the form of a main source file text. Storing means 2.1 is operatively connected with data processing means 2.3 which implement the compiler 2.4. Compiler 2.4 is adapted to translate source code 2.2 into a predefined type of target code, as known to a person skilled in the art.

According to the embodiment of FIG. 1, compiler 2.4 comprises a pre-processor 2.5 including connection-establishing means 2.6 and downloading means 2.7, the functioning of which will become apparent later.

Remote server 3 comprises storing means 3.1 for storing additional source code files 3.2a, 3.2b, ..., only two of which are depicted for reason of clarity. As will be appreciated by a person skilled in the art, the additional source code files 3.2a, 3.2b can either be stored in storing means 3.1 in the form of additional source code text files or—alternatively or additionally—in the form of precompiled code files. Hereinafter, storing means 3.1 on remote server 3 will also be referred to as repository for the additional source code files 3.2a, 3.2b.

Furthermore, remote server 3 comprises updating means 3.3 which are adapted for ensuring that the additional source code files 3.2a, 3.2b stored in the repository on remote server 3 represent a most recent (up-to-date) version of the respective additional source code.

During operation of computer system 1 of FIG. 1, source code 2.2 is provided to compiler 2.4 for generating the target code. For instance, source code 2.2 may represent a main source text file written in the C programming language, and compiler 2.4 may be devised to translate the main source file text into a machine-readable object code.

The compiling process involves a pre-processing step implemented by pre-processor 2.5 which comprises including at least one additional source code file, i.e., one of the additional source code files 3.2a, 3.2b, into source code 2.2 prior to generating the target code. As will be explained in detail below with reference to appended FIG. 2, pre-processor 2.5 may be commanded to include the additional source code file by means of corresponding pre-processor instructions included in source code 2.2.

In accordance with an embodiment of the present invention, for to include the at least one additional source code file into source code 2.2 pre-processor 2.5 controls connection-establishing means 2.6 to establish network connection 4 with remote server 3. Using downloading means 2.7, pre-processor 2.5 then downloads a most recent (up-to-date) version of at least one required additional source code file 3.2a, 3.2b from the remote server 3 and includes the at least one additional source code file into source code 2.2 prior to performing further compiling steps by means of pre-processor 2.5 and/or compiler 2.4.

In this way, compiler 2.4 on local computer 2 always uses the most recent version of additional source code files 3.2a, 3.2b when compiling source code 2.2 without the need for cumbersome and/or time-consuming manual updates of the additional source code files on local computer 2.

Figure 2:
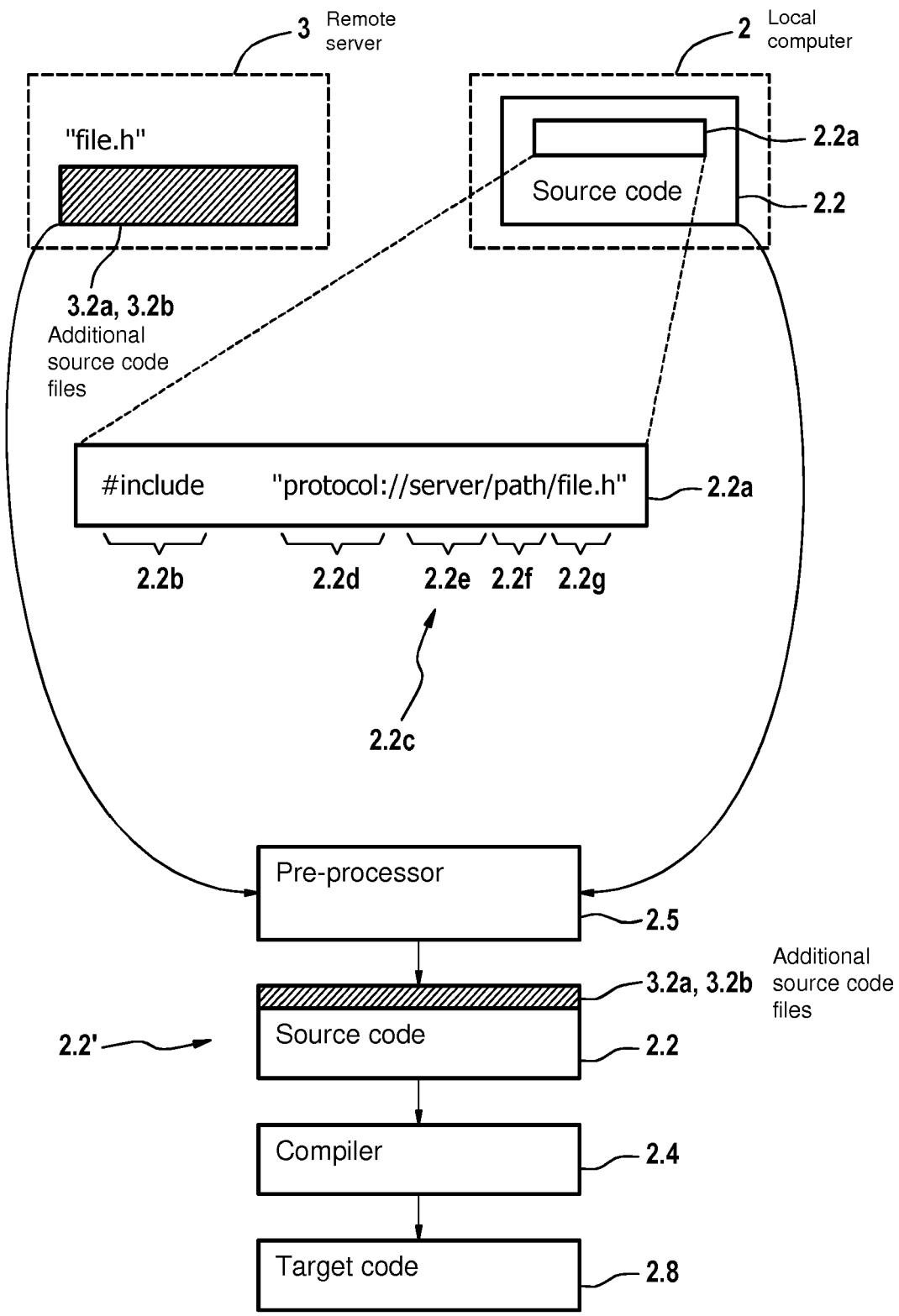
FIG. 2 is a functional block diagram for illustrating operation of the computer system in FIG. 1 in accordance with the present invention.

FIG. 2 shows a functional block diagram for illustrating operation of the computer system in FIG. 1 in accordance with the present invention. In FIG. 2, the same reference numerals are used for denoting elements which have been previously described with reference to appended FIG. 1.

As already stated above, for triggering network download of remote additional source code files, in accordance with an embodiment of the present invention, source code 2.2 may comprise at least one dedicated source code element 2.2a which represents a command to pre-processor 2.5 for establishing a network connection and for downloading the required additional source code file from a remote server, as previously described.

According to the embodiment of FIG. 2, the source code element 2.2a is devised in the form of a C-type "#include" command 2.2b followed by an URL (Uniform Resource Locator) 2.2c including respective identifiers of a network protocol 2.2d to be used for downloading the additional source code, a remote server identifier 2.2e, an identifier 2.2f for a repository path on the remote server, and an identifier (file name) 2.2g of an additional source code file to be downloaded.

In the C-type language example of FIG. 2, an additional source code file 3.2a, 3.2b to be included in source code 2.2 is generally referred to as a header file with suffix ".h". Such header files are typically used in connection with libraries, i.e., collections of sub-programs for software development, and define APIs (Application Programming Interfaces) of a given library by means of function prototypes.

Referring again to appended FIG. 2, source code 2.2 comprising source code element 2.2a is provided to pre-processor 2.5 which downloads additional source code 3.2a, 3.2b, as previously described with reference to appended FIG. 1, from remote server 3, thus producing augmented source code 2.2' comprising original source code 2.2 and included additional source code 3.2a, 3.2b, as further illustrated in FIG. 2. Augmented source code 2.2' is then further processed by compiler 2.4 for generating the target code denoted by means of reference numeral 2.8 in FIG. 2.

Exemplary protocols which may be specified within URL 2.2c may include any one of standard protocols like http (Hypertext Transfer Protocol), ssh (Secure Shell), ftp (File Transfer Protocol), or the like. Furthermore, by means of network connection 4 (FIG. 1) access to software management servers could be provided (e.g., in the context of cvs, svn, git, or the like) to allow for transparent update from code repositories, such as repository 3.1 on remote server 3 (FIG. 1).

In order to optimize the above-described downloading process of additional source code files, respective file-locking mechanisms active in an operating system of local computer 2 and/or remote server 3 may be exploited in order to obtain atomic access, i.e., access undisturbed by any signal handler during an actual file access process.

Figure 3:
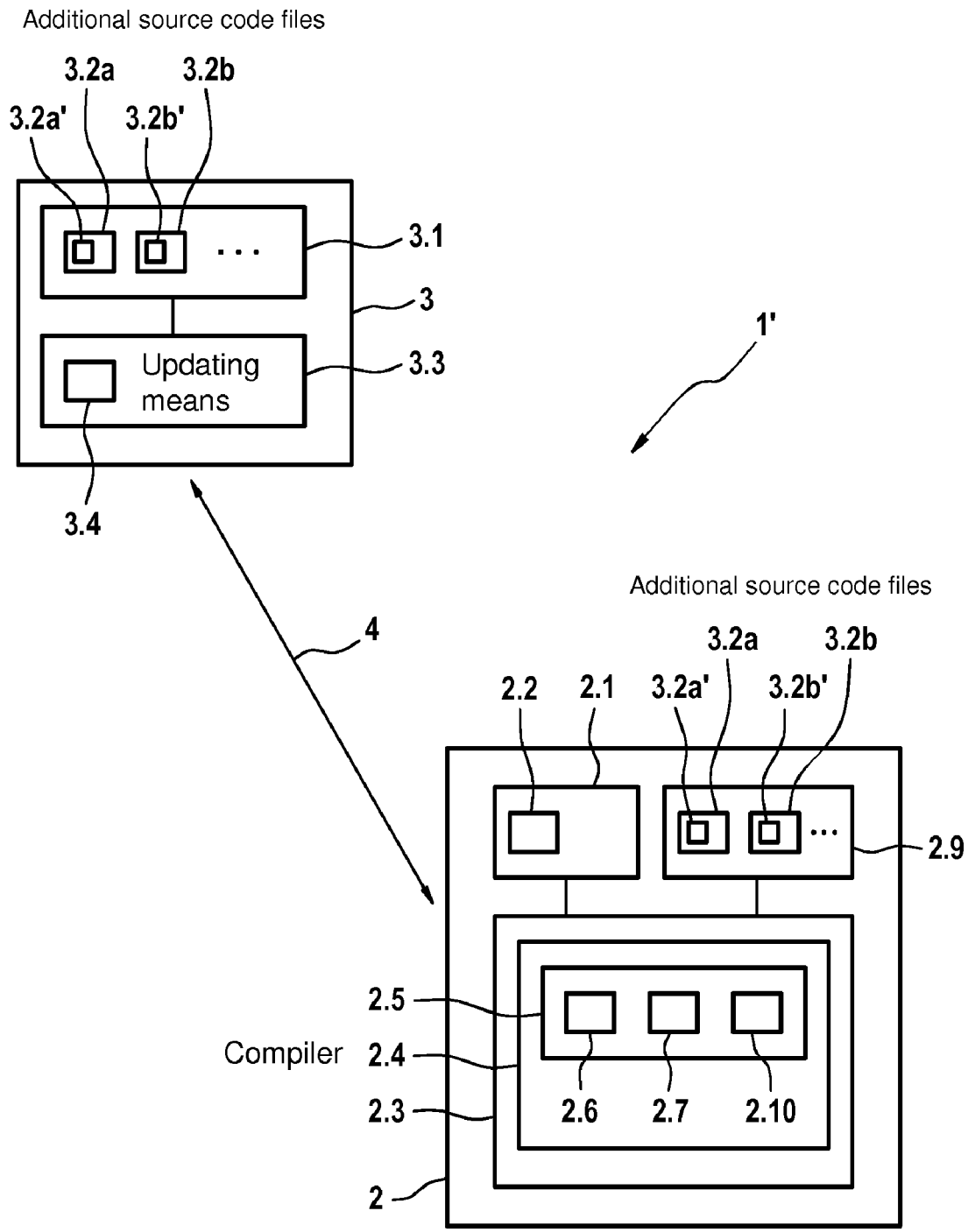
FIG. 3 is a schematic block diagram of a second embodiment of the computer system in accordance with the present invention comprising an embodiment of the compiler in accordance with the present invention.

FIG. 3 shows a schematic block diagram of a second embodiment of the computer system in accordance with the present invention comprising an embodiment of the compiler in accordance with the present invention. The computer system 1' of FIG. 3 generally corresponds to computer system 1 as previously described with reference to appended FIG. 1.

The same reference numerals as in FIG. 1 are used in FIG. 3 to denote the same or similar elements. In the following, only configurational and/or functional differences with respect to the computer system 1 of FIG. 1 will be described in detail.

As can be gathered from the embodiment of FIG. 3, local computer 2 comprises an additional storing means 2.9, hereinafter also referred to as caching means.

Within pre-processor 2.5 compiler 2.4 comprises checking means 2.10, a functioning of which will become apparent later.

Within its updating means 3.3, remote server 3 further comprises time-stamping means 3.4, a functioning of which will also become apparent later.

Caching means 2.9 is adapted to store local copies of additional source code files 3.2a, 3.2b downloaded from remote server 3 as previously described with reference to appended FIG. 1. In this way, cached access to the local copies of additional source code files 3.2a, 3.2b by pre-processor 2.5 may be provided in order to reduce traffic on network connection 4.

In order to guarantee that pre-processor 2.5 always uses a most recent version of the additional source code files 3.2a, 3.2b, the time-stamping means 3.4 of remote server 3 marks every stored source code file 3.2a, 3.2b with a respective time-stamp 3.2a', 3.2b' indicating an update time or a version number of each additional source code file 3.2a, 3.2b. When downloading the additional source code files from remote server 3 for caching in storing means 2.9, local computer 2, i.e., pre-processor 2.5 also downloads the time-stamps 3.2a', 3.2b' together with the additional source code files. By means of network connection 4, checking 2.10 is thus enabled to compare a time-stamp/version number of a given additional source code file cached in storing means 2.9 with a respective time-stamp/version number of the same file in repository 3.1 on remote server 3. If the respective time-stamps/version numbers are identical, pre-processor 2.5 may use the locally cached copy of a given additional source code file 3.2a, 3.2b instead of downloading it from remote server 3, thus reducing network traffic. Otherwise, if the respective time-stamps/version numbers differ from each other, i.e., the locally cached copy of a given additional source code file 3.2a, 3.2b is outdated with respect to the most recent version of the same file available from remote server 3, then pre-processor 2.5 uses downloading means 2.7 to download a copy of a required additional source code file 3.2a, 3.2b from remote server 3, as previously described with respect to FIGS. 1 and 2.

Figure 4:
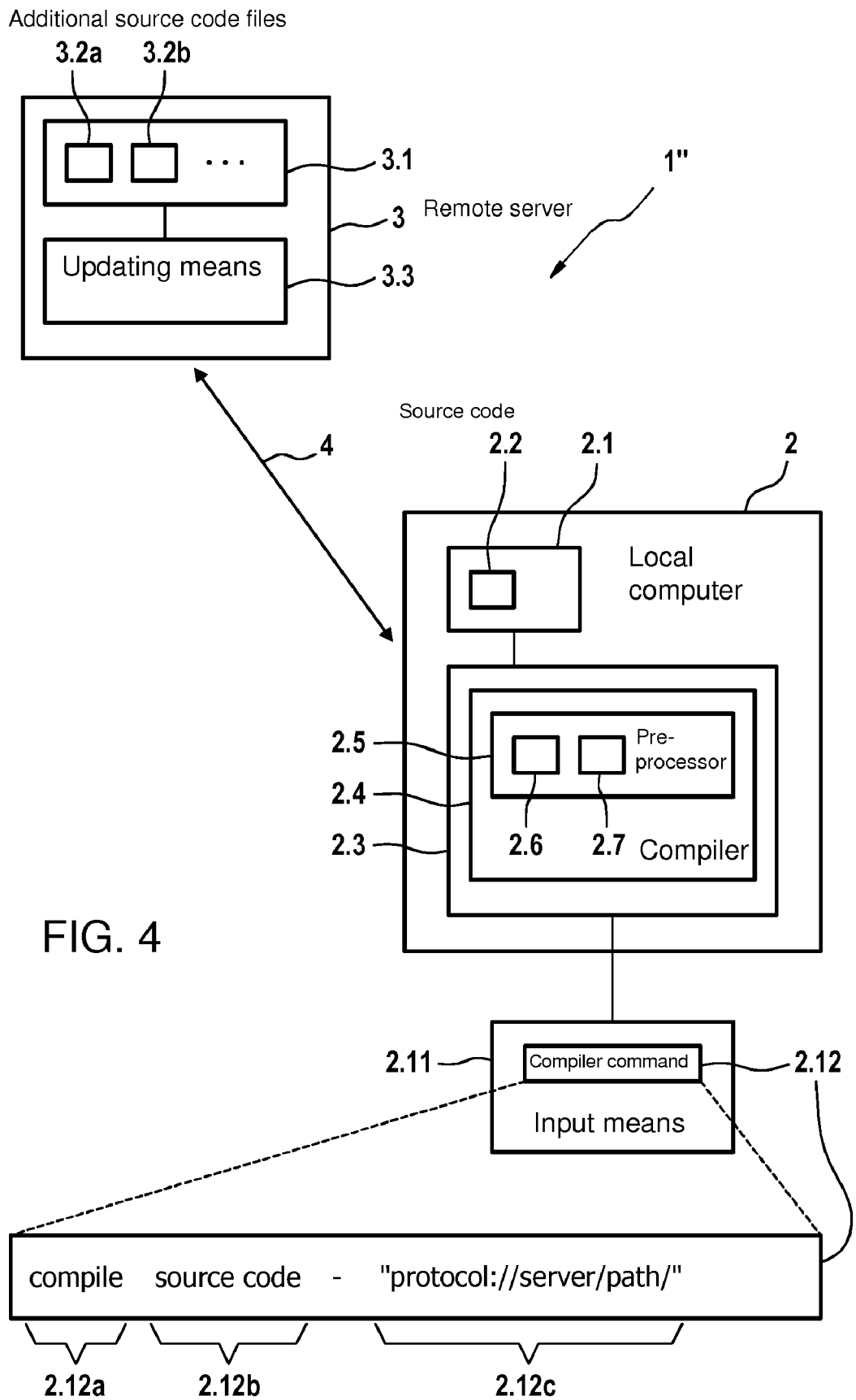
FIG. 4 is a schematic block diagram of a third embodiment of the computer system in accordance with the present invention comprising an embodiment of the compiler in accordance with the present invention.

FIG. 4 shows a schematic block diagram of a third embodiment of the computer system in accordance with the present invention comprising an embodiment of the compiler in accordance with the present invention. The computer system 1" of FIG. 4 generally corresponds to computer system 1 as previously described with reference to appended FIG. 1. In FIG. 4, the same reference numerals as in FIG. 1 have been used to denote the same or similar elements.

However, as will be appreciated by a person skilled in the art, the computer system 1" of FIG. 4 could also be devised on the basis of computer system 1' as previously described with reference to appended FIG. 3. In the following, only the differences between the embodiment of FIG. 4 and the previously described embodiments according to appended FIGS. 1 and 3 will be described in detail.

As can be gathered from FIG. 4, local computer 2 further comprises input means 2.11 in operative connection with compiler 2.4. Input means 2.11 are adapted to input a compiler command 2.12 to compiler 2.4 for controlling the latter.

According to FIG. 4, compiler command 2.12 comprises the actual command word 2.12a (here the word "compile"), a parameter 2.12b indicating the main source file text to be compiled (i.e. source code 2.2 in the present example), and a command option 2.12c. In the exemplary embodiment of FIG. 4 the command option 2.12c is introduced by the sign "-" and—to some extent—corresponds to URL 2.2c of FIG. 2. As can be gathered from FIG. 4, command option 2.12c indicates a protocol, a server, and (optionally) a path on the server, which are to be used for locating and downloading a required additional source code file 3.2a, 3.2b from a remote server specified by the command option 2.12c, e.g., remote server 3 according to FIGS. 1-4.

Note that compiler 2.4 will use the information comprised in the command option 2.12c, i.e. server name and path on that server, in connection with a file name comprised in a corresponding include directive in source code 2.2. This means that compiler 2.4 will "assemble" a complete URL from the information comprised in the compiler option and the include file name comprised in the source code. Thus, existing source code may benefit from the proposed feature of remote include without requiring any modification.

In this way, in addition or as an alternative to the embodiment of FIG. 2, according to FIG. 4 download-related information with respect to protocol, server or path for downloading a required additional source code file can be modified without having to modify the source code file 2.2.

As will be appreciated by a person skilled in the art, a general concept underlying the embodiment of FIG. 4 may be extended to file-converting automation utilities, e.g., "make" (Unix), "Ant", or the like, by providing command structures which can be used within the utilities for modifying the download process for additional source code files without modifying the source code 2.2 itself, as previously described.

Figure 5:
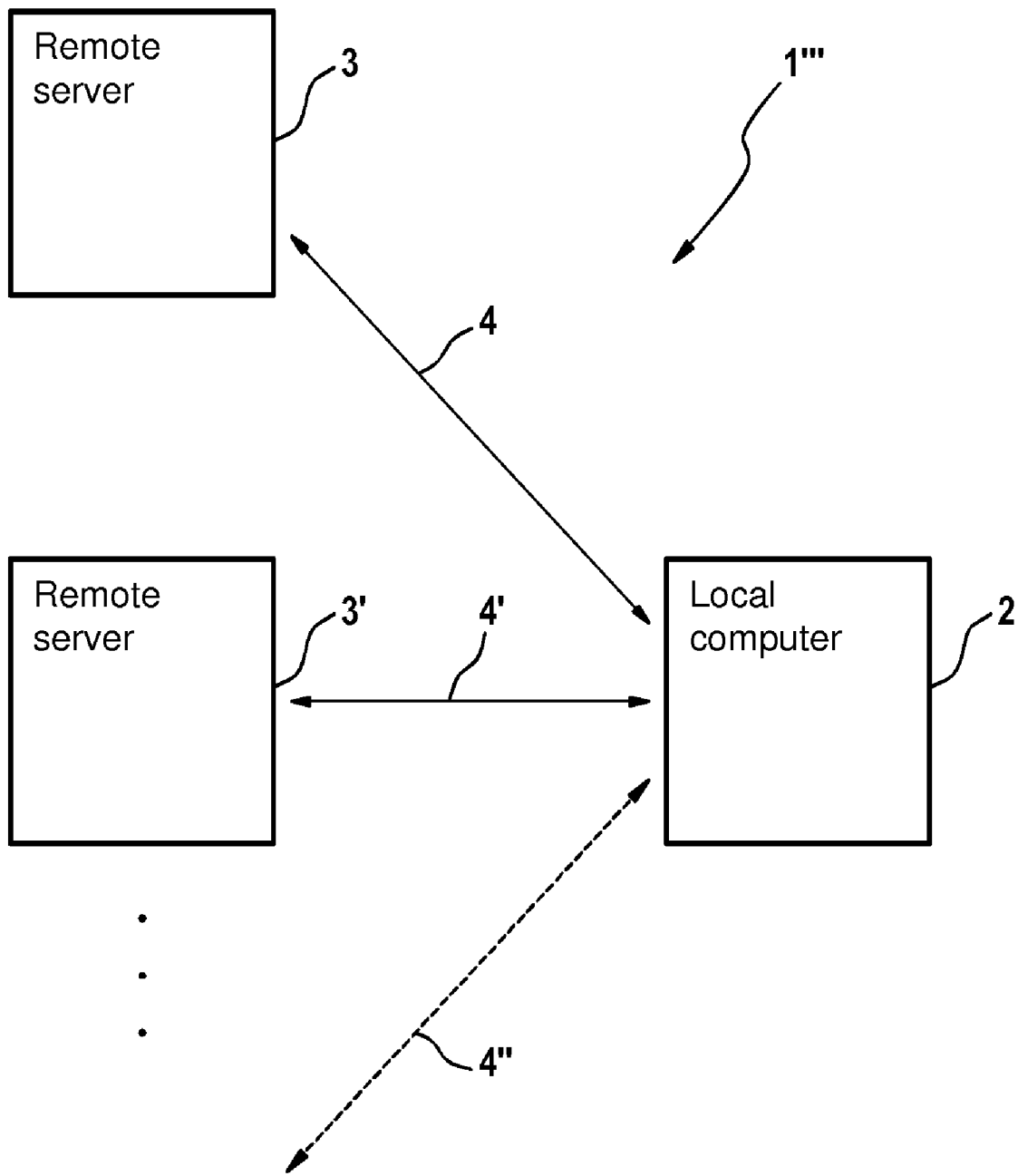
FIG. 5 is a schematic block diagram of a fourth embodiment of the computer system in accordance with the present invention comprising an embodiment of the compiler in accordance with the present invention.

FIG. 5 shows a schematic block diagram of a fourth embodiment of the computer system in accordance with the present invention comprising an embodiment of the compiler in accordance with the present invention. The computer network 1''' of FIG. 5 comprises local computer 2 which may (simultaneously) establish network connections 4, 4', 4'' with a plurality of remote servers 3, 3', . . . only two of which are depicted for reason of clarity. As will be appreciated by a person skilled in the art, remote servers 3, 3' of FIG. 5 may be devised in accordance with any one of the embodiments that were previously described with reference to appended FIGS. 1 to 4. In particular, one of the plurality of remote servers 3, 3' in FIG. 5, e.g., remote server 3, may be devised in accordance with the embodiment of FIG. 1, whereas another one the plurality of remote servers 3, 3', e.g., remote server 3' may be devised in accordance with the embodiment of FIG. 3.

In the embodiment of FIG. 5, network connection-establishing means 2.6 of compiler 2.4/pre-processor 2.5 on local computer 2 are adapted to establish a plurality of network connections 4, 4', 4'' simultaneously with the plurality of remote servers 3, 3' for downloading additional source code files 3.2a, 3.2b—at least in case locally cached copies of the additional source code files 3.2a, 3.2b are outdated with respect to the most recent versions available from the remote servers 3, 3'.

In the exemplary embodiment of FIG. 5, remote server 3 comprises storing means/repository 3.1 for storing first additional source code files 3.2a, 3.2b while remote server 3' comprises storing means/repository 3.1' for storing second additional source code files 3.2c, 3.2d.

In this way local computer 2 may download required additional source code files concurrently from a plurality of remote servers 3, 3'. Additionally, a variety of download protocols may be used in parallel on the plurality of established network connections 4, 4', 4''.

As will be appreciated by a person skilled in the art, implementing and/or configuring/controlling of the various functional elements comprised on local computer 2 and/or remote servers 3, 3' in accordance with the embodiments of FIGS. 1 to 5 may be achieved by means of a computer program product which provides suitable program code sequences. The program code sequences may be written in any suitable computer language, e.g., and without limitation, C/C++, Java™, or the like. Furthermore, the program code sequences may be provided to local computer 2 by any suitable means (not shown), e.g., on a computer-readable data carrier, via a network connection, or the like.

Figure 6:
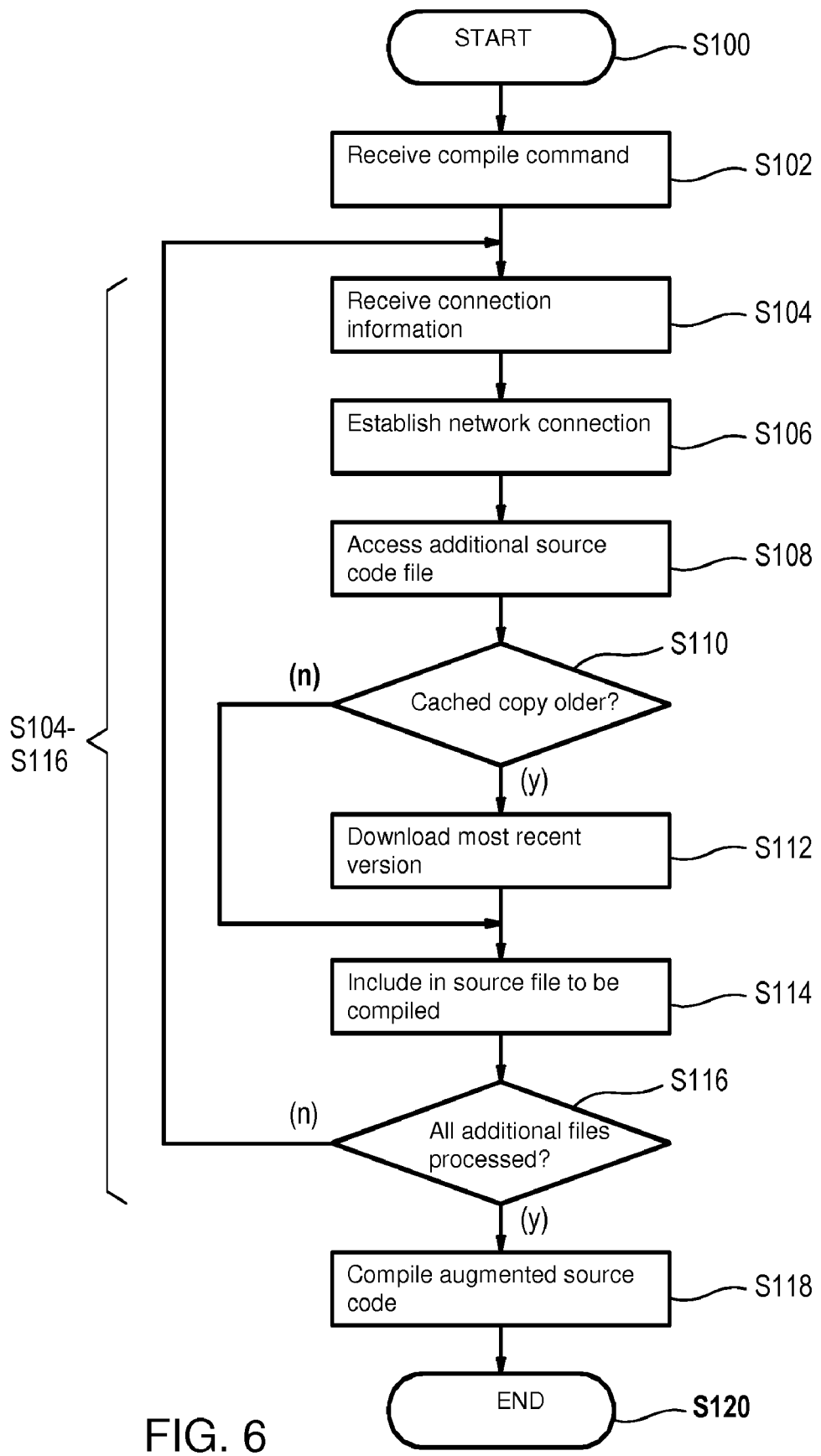
FIG. 6 is a flow chart illustrating an embodiment of the method in accordance with the present invention.

FIG. 6 shows a flow chart for illustrating an embodiment of the method in accordance with the present invention.

According to the embodiment of FIG. 6, the inventive method starts with step S100. In subsequent step S102 the local computer, i.e., a compiler implemented thereon, receives a command to compile a particular source code.

In subsequent step S104, a pre-processor comprised within the compiler receives connection information with respect to a network connection to at least one remote server which is required for downloading at least one additional source code file which has to be included into the source code prior to compilation. According to the embodiment of FIG. 2, the connection info may be included in the source code. Alternatively, as described with reference to appended FIG. 4, the connection info may be included as an option in the compiler command received in step S102.

Then, in step S106 the compiler establishes the network connection(s) through dedicated connection-establishing means. In subsequent step S108, the compiler thus accesses the at least one additional source code file on a remote server for fetching its time-stamp/version number.

In subsequent step S110, the time-stamp/version number is compared with a time-stamp/version number of a corresponding cached copy of the additional source code file in question on the local computer. Step S110 determines whether or not the cached copy of the additional source code file in question is older than the most recent version available from the remote server. If the question in step S110 is answered in the affirmative (y), then in step S1112 the most recent version of the additional source code file is downloaded from the remote server via the established network connection. Otherwise, if the question in step S110 is answered in the negative (n), then the step S112 is omitted and the locally cached copy of the additional source code file is used to avoid network traffic.

In subsequent step S114, either the downloaded version of the additional source code file or the locally cached version of the additional source code file is included in the source file to be compiled by means of the co-processor.

Then, in step S116 a further decision step is performed to determine whether or not all additional source files which are to be included in the source code have been downloaded or read from the local cache. If the question in step S116 is answered in the affirmative (y), then the augmented source code (i.e., including the additional source code files) is compiled in step S118, and the method terminates with step S120. Otherwise, if the question in step S116 is answered in the negative (n), then the method returns to step S104 in order to include further additional source code files in the source code.

As will be appreciated by a person skilled in the art, at least the method steps S104-S116 may be performed in parallel for a plurality of required additional source code files available from a plurality of repositories residing on a plurality of remote servers, as already stated above in connection with appended FIG. 5.

What is claimed is:

1. A computer-implemented method of compiling source code, involving a pre-processing step for including an additional source code file into the source code prior to generating target code from the source code, comprising the steps of:
   fetching a version indicator of the additional source code file on a remote server;
   comparing the fetched version indicator with the version indicator of a locally cached copy of the additional source code file;
   if the version indicator of the locally cached copy indicates an older version than the fetched version indicator, downloading a copy of the additional source code file from the remote server and using the downloaded copy of the additional source code file to augment the source code;
   if the version indicator of the locally cached copy indicates a newer version than the fetched version indicator, using the locally cached copy of
   the additional source code file to augment the source code without downloading a copy from the remote server;
   compiling the augmented source code to generate target code; and
   saving locally the copy of the additional source code file used to augment the source code after generation of the target code for use in a subsequent compilation of source code.

2. The method of claim 1, comprising the step of establishing, during the pre-processing step, a network connection to the remote server.

3. The method of claim 1, comprising the step of using a local copy of the additional source code file if a network connection to the remote server cannot be established.

4. The method of claim 1, comprising the step of providing a network location of the additional source code file as an element of the source code.

5. The method of claim 1, comprising the step of providing and/or modifying a network location of the additional source code file in the form of a command option when invoking a compiler for compiling the source code.

6. The method of claim 1, comprising the step of downloading a precompiled version of the additional source code.

7. A system comprising a computer configured to perform the method steps of claim 1.

8. The method of claim 1, wherein the version indicator comprises a time-stamp or a version number.

9. The method of claim 1, comprising the step of establishing a plurality of network connections with different remote servers and/or using different connection protocols.

10. A computer program product stored on a non-transitory computer-usable medium, comprising computer-readable program code for causing a computer to perform the method of claim 1.

* * * * *